United States Patent
Bentjens et al.

[11] Patent Number: 5,957,628
[45] Date of Patent: Sep. 28, 1999

[54] FACE MILLING CUTTER OR ANGULAR MILLING CUTTER

[75] Inventors: Bernhard Bentjens, Schwarzenbek; Uwe Schunk, Lübeck; Reinhard Wagner, Hamburg; Gerhard Dehn, Mölln; Werner Kölker, Ratzeburg, all of Germany

[73] Assignee: Wilhelm Fette GmbH, Schwarzeubek, Germany

[21] Appl. No.: 08/996,953

[22] Filed: Dec. 23, 1997

[30] Foreign Application Priority Data

Feb. 19, 1997 [DE] Germany .............................. 197 06 377

[51] Int. Cl.$^6$ ........................................................ B23C 5/20
[52] U.S. Cl. .................................. 407/35; 407/38; 407/39; 407/47
[58] Field of Search .................................. 407/35, 36, 38, 407/39, 43, 44, 46, 47, 50, 51, 53, 118

[56] References Cited

U.S. PATENT DOCUMENTS

| | | | |
|---|---|---|---|
| 2,415,136 | 2/1947 | Jerome | 407/39 |
| 3,490,118 | 1/1970 | Corti | 407/44 |
| 4,884,476 | 12/1989 | Okuzumi et al. | 407/118 X |
| 5,146,963 | 9/1992 | Carpenter et al. | 407/41 X |
| 5,209,610 | 5/1993 | Arai et al. | 407/36 |

FOREIGN PATENT DOCUMENTS 0891256 12/1981 U.S.S.R. .................................. 407/39

*Primary Examiner*—Andrea L. Pitts
*Assistant Examiner*—Henry W. H. Tsai
*Attorney, Agent, or Firm*—Vidas, Arrett & Steinkraus, P.A.

[57] ABSTRACT

A face milling cutter or angular milling cutter, with a carrier body which on its periphery at regularly or irregularly distributed distances comprises pockets which extend parallel to the rotational axis of the carrier body for accommodating cassettes which for their part comprise seating surfaces for receiving cutting plates, with a fastening device for the cutting plates in the cassette, with a screw fastening for fixing the cassettes in the pockets and with adjusting screws for a limited axial adjustment of the cassettes in the pockets, wherein the adjusting screws are seated in threaded bores of the carrier body, which proceeding from the end-face of the carrier body are arranged approximately parallel to the rotational axis of the carrier body.

12 Claims, 2 Drawing Sheets

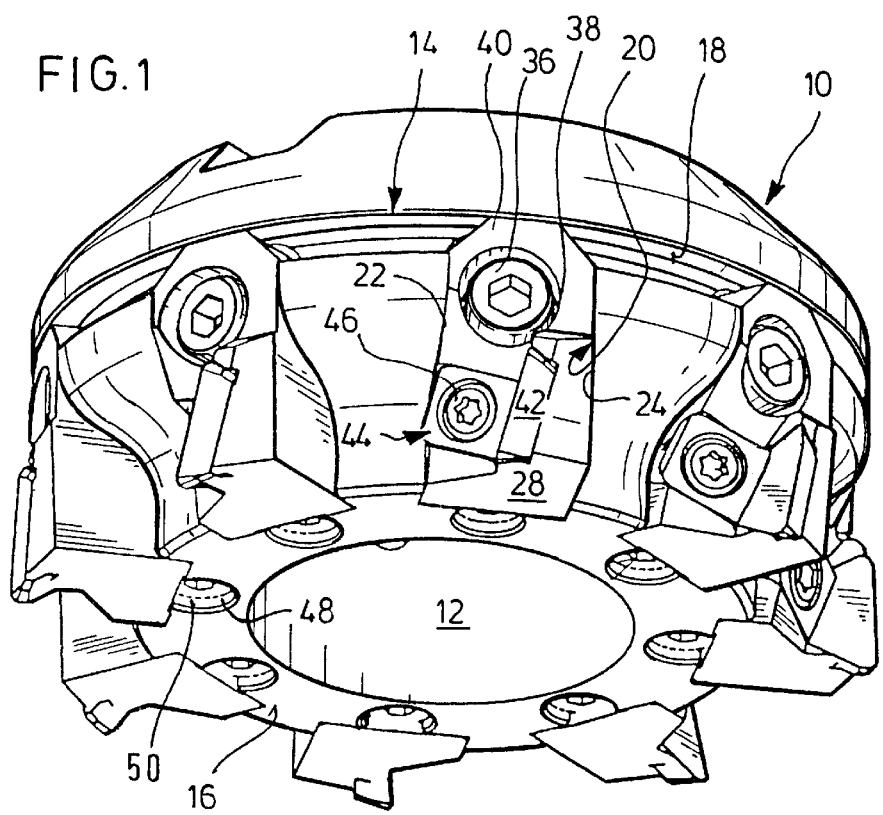
FIG. 1
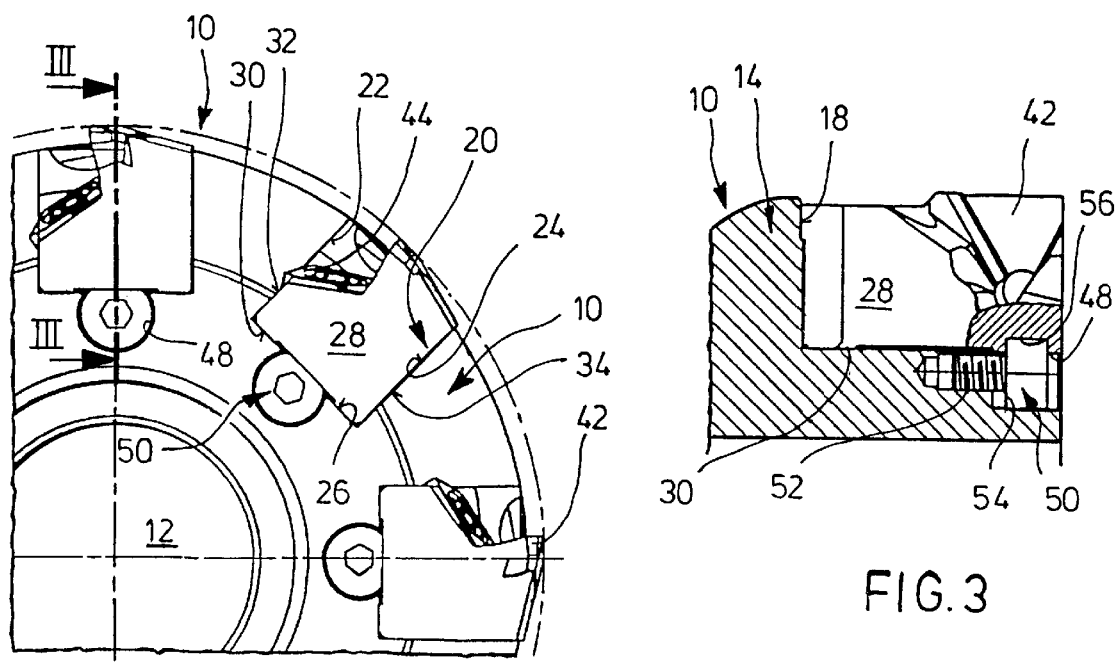
FIG. 2
FIG. 3

FACE MILLING CUTTER OR ANGULAR MILLING CUTTER

BACKGROUND OF THE INVENTION

The invention relates to a face milling cutter or angular milling cutter.

As is known in milling tools, with the help of suitable clamping devices cutting plates or cutting inserts may be clamped directly against corresponding seating surfaces of a carrier body or into so-called cassettes which for their part are fastened on the carrier body.

From DE 44 37 426 a face milling cutter or angular milling cutter is known with which the cassettes are accommodated in peripheral pockets of a carrier body. The peripheral pockets extend parallel to the rotational axis of the carrier body, and the cassettes are pulled against the floor of the pockets and fastened thereto with the help of a fastening screw. The axis of the threaded bore in the carrier body is at an angle to the corresponding radial plane in order to additionally press the cassette against a preferred lateral wall of the pocket. For axially adjusting the cassettes, at the height of each pocket on the side lying opposite the free end-face there is provided a bore for a pin comprising an eccentric, wherein the eccentric section is brought to bear against the allocated end of the cassette. If the cassette is to be further displaced in the direction of the free end-face, by way of a suitable tool there is effected a rotation of the pin until the desired setting is achieved. An adjustment in the opposite direction may not be carried out with the aid of the eccentric pin, but rather this must be rotated to the smallest distance in order to subsequently, with the aid of a hitting tool or likewise, bring the cassette to bear against the eccentric section.

From WO 94/25211 there has also become known a milling tool with which the carrier body likewise comprises pockets parallel to the axis which accommodate cassettes. The cassettes may be adjusted in the axial and in the radial direction. For adjustment in the radial direction an adjusting screw is screwed into a radial threaded bore of the cassette, wherein the inner end of the adjusting screw cooperates with the floor of the pocket. For axial adjustment a radial threaded bore is provided in the floor of the pocket, which comprises a screw pin with an eccentric head which cooperates with a groove on the lower side of the cassette. Above the groove there extends a radial bore somewhat smaller in diameter, via which a tool for rotation of the eccentric head may be introduced. On the rear side the cassette is provided with a radial toothing or toothing parallel to the axis which cooperates with a corresponding toothing of a distance element which for its part comprises a radial gearing or a gearing parallel to the axis, which cooperates with a corresponding gearing on the allocated wall of the pocket. If the adjustment of the cassette is carried out in the described way and manner at least one attachment screw which is screwed into an oblique threaded bore of the carrier body is tightened for the purpose of bearing on the cassette in order to tension this in the pocket in a clamping manner (i.e. with a friction fit).

BRIEF SUMMARY OF THE INVENTION

It is the object of the invention to provide an adjusting possibility for cassette milling cutters of the mentioned type, which is easily accessible and allows an active adjustment in both adjusting directions. Furthermore a milling cutter is to be provided with which the same carrier body may be used for running in the anti-clockwise direction or the clockwise direction.

With the inventive an adjusting screw is arranged in a threaded bore of the carrier body, which proceeding from the end-face of the carrier body, extends approximately parallel to the rotational axis of the carrier body. Such an arrangement of the adjusting screw is particularly simply accessible. The accessibility is not dependent on that of face milling cutter or angular milling cutter. With an appropriate design of the cassette and adjusting screw furthermore in a simple manner an active adjustment of the cassette in both directions, i.e. towards the free end-face or away from it, may be achieved. This may for example be effected in the manner that the head of the adjusting screw cooperates with a groove on the floor of the cassette. In each case according to the rotating direction thus the cassette is moved away from the end-face or towards it. It is clear that the adjusting paths are naturally relatively slight and may only move in the tolerance range which is predetermined by the fastening of the cassette. This determines the rough setting whilst by way of the adjusting screw the fine setting is effected.

With the solution according to the invention the cassette is accommodated approximately in a snug fit by the accompanying pocket and by way of a single fastening screw, is fastened in the accompanying pocket. The fastening screw extends through a radial bore of the cassette and is seated in a radial threaded bore in the floor of the pocket. With this it is assumed that the pockets and cassettes may be produced with adequate precision in order to make a pinching of the cassette against a pocket wall superfluous. Indeed it is sufficient to fix the cassette in the pocket with the help of a radially acting screw. Such a design then has the advantage that it is not important how the cassette is made, i.e. whether it accommodates cutting plates for anti-clockwise rotation or clockwise rotation. Furthermore the geometry of the cutting plates and plate seatings no longer influences the carrier body. Thus for a multitude of applications always the same carrier body can be used.

The invention is particularly advantageous with a design of the carrier body in which the outer diameter towards the free end-face becomes smaller continuously or in steps.

Thus for the purpose of adaptation to a different number of variously sized cutting plates, a relatively large dimensioned cassette may be used without there arising problems with the removal of the swarf. By way of the carrier dimensioned small in the outer diameter near the free end-face, there is created a sufficiently large space for removal of the swarf.

Preferably the cutting plates are kept in the cassette with the aid of a clamping lever. Selectively the same cassette may accommodate the cutting plates also by way of screw fastening when the cassette is provided with an appropriate threaded bore in the plate seating. It is then clear that the cutting plate then likewise must comprise a through-bore. With this fastening manner the threaded bore in the cassette for the clamping lever fastening may be closed by a blind plug.

BRIEF DESCRIPTION OF THE DRAWINGS

The invention is hereinafter described in more detail by way of the drawings.

FIG. 1 shows perspectively an angular milling head according to the invention.

FIG. 2 shows a part of the milling head according to FIG. 1 in a front view.

FIG. 3 shows a section through the representation according to FIG. 2 taken along the line 3—3.

DETAILED DESCRIPTION OF THE INVENTION

Figure 4:
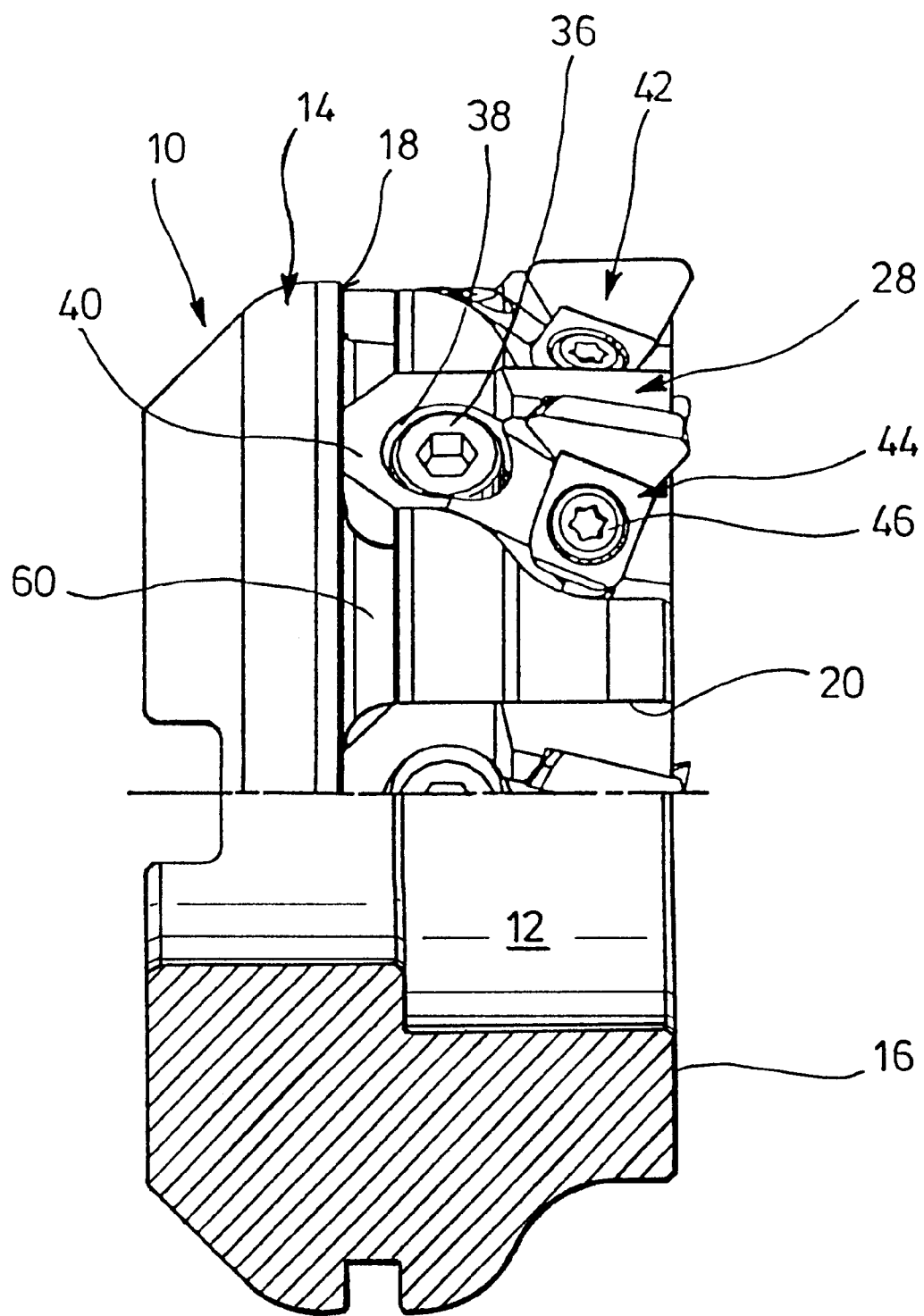
FIG. 4 shows partly in section, partly in a lateral view displaced about 90° with respect to FIG. 2, the milling head according to FIG. 1

The angular milling cutter shown in FIGS. 1 to 4 as a preferred embodiment comprises a carrier body 10 with a stepped central through-bore 12 for the adaptation to the spindle of a machine tool or likewise. The carrier body 10 comprises an annular collar 10 which to the free end-face 16 of the carrier body 14 comprises a radial abutment surface 18. Between the abutment surface 18 and the end-face 16 on the periphery of the carrier body at distances there are formed pockets 20 or grooves which extend parallel to the rotational axis of the rotary body 10 and comprise oppositely lying lateral walls 22, 24 and a floor 26. Between the pockets 20 the carrier body is continuously reduced in its outer diameter towards the end-face 16, wherein there results in a preferred formation in a radial section an approximate S-shaped contour.

The pockets 20 accommodate cassettes 28 with a positive fit, i.e. they are accommodated approximately in a snug fit in that a lower side 30 cooperates with the floor 26 and lateral walls 32, 34 with the lateral walls 22, 24 of the pockets 20. In the floor 26 there is provided a radial threaded bore (not shown) for a threaded screw 36 which is inserted through a radial bore 38 of the cassette 28 in order to fix the cassette in the pocket 20. A section 40 of the cassette 28 reduced in width lies near the abutment surface 18.

Each cassette 28 comprises seating surfaces, which are not shown, for receiving cutting inserts or cutting plates 42. The cutting inserts 42 in a preferred design are fastened by clamping levers 44 which comprise a through-bore for receiving an attachment screw 46 which is seated in a threaded bore of the cassette 28, which is not shown. On tightening the attachment screw 46 the clamping levers 44 tilt against the allocated surface of the cutting insert 42 and fix these on the seating surfaces.

In the end surface 16 aligned centrally to the pockets 20 there are formed bores 48 parallel to the axis in the carrier body, in which adjusting screws 50 are seated. The adjusting screws have a shank 52 which comprises a threaded section and which sits in a corresponding threaded section of the bore 48, and a head 54 which sits in an extended bore section of the bore 48 and which engages into a groove 56 which is formed on the lower side 30 of the cassette 28. If the screw 50 is turned the cassette 28 co-moves in the direction parallel to the axis to the end-face 16 or away from this. In this manner the axial position of the cassette 28 and thus of the cutting insert 42 may be adjusted to a limited degree, wherein the extent depends on the tolerance which exists between the fastening screw 36 and the cassette 28.

In rough work application the function of the adjusting screw 50 may be done away with, and the cassettes 28 are laid against the end surface 16 so that also correspondingly large axial forces may be accommodated.

As is deduced in particular from FIG. 1, the cassettes 28 near the end-face 16 project radially relatively far out of the body. This is related to the corresponding reduction in diameter of the carrier body in this region, so that adequately large swarf chambers for the removal of the swarf are formed. The forming of the carrier body has the further advantage that relatively large cassettes may be applied for correspondingly large dimensioned cutting plates. As can be recognised, it is not important for the carrier body and the fastening whether anti-clockwise running or clockwise running is foreseen.

In the embodiment example shown, the pocket 20 is rectangular in cross-section so that insertion of the cassettes 28 in the radial direction is possible. It is however also conceivable to design the pockets 20 narrowing in the radial direction towards the outside, e.g. in the manner of a dovetail, in order to obtain a securement against centrifugal forces. It is clear that also a differently formed positive fit may be used as a centrifugal force securement.

For the sake of completeness it is pointed out that the abutment surface between the pockets 20 forms a groove 60.

We claim:

1. A milling cutter comprising:
    a carrier body having a rotational axis and an end-face which is substantially perpendicular to the rotational axis, the carrier body including a plurality of pockets spaced around its periphery, each pocket extending parallel to the rotational axis of the carrier body, each pocket for accommodating a cassette, the cassette including a seating surface for receiving a cutting plate;
    a fastening device for attaching the cutting plate to the seating surface;
    a screw fastening for fixing the cassette in the pocket;
    each pocket including an adjusting screw for providing axial adjustment of the cassette in the pocket, the adjusting screw being seated in a threaded bore of the carrier body which extends from the end-face of the carrier body and is approximately parallel to the rotational axis of the carrier body, the adjusting screw having a head and the cassette having a bottom having a groove, the head of the adjusting screw cooperating with the groove of the cassette to provide axial adjustment of the cassette in the pocket.

2. The milling cutter of claim 1 wherein the milling cutter is a face milling cutter.

3. The milling cutter of claim 1 wherein the milling cutter is an angular milling cutter.

4. The milling cutter of claim 1 wherein the pockets are spaced evenly around the periphery of the carrier body.

5. A milling cutter according to claim 1, wherein the head is accommodated approximately fitting in the groove.

6. A milling cutter according to claim 1, wherein the cassette comprises a clamping lever which by way of an attachment screw which extends through a bore of the clamping lever and is seated in a threaded bore of the cassette, is clamped tiltingly against the cutting plate.

7. A milling cutter according to claim 1, wherein the cassette comprises a threaded bore for the fastening of the cutting plate by way of a clamping screw extending through a bore of the cutting plate.

8. A milling cutter according to claim 1, wherein the cutting plate is fastened to the cassette by soldering, welding or adhesing.

9. A milling cutter according to claim 1, wherein the cassette utilizes a positive fit centrifugal force securement.

10. A milling cutter comprising:
    a carrier body having a rotational axis and an end-face which is substantially perpendicular to the rotational axis, the carrier body including a plurality of pockets spaced around its periphery, each pocket having a bottom and extending parallel to the rotational axis of the carrier body, each pocket for accommodating a cassette, the cassette including a seating surface for receiving a cutting plate;
    a fastening device for attaching the cutting plate to the seating surface;
    a screw fastening for fixing the cassette in the pocket;
    each pocket including an adjusting screw for providing axial adjustment of the cassette in the pocket, wherein the cassette is accommodated by the pocket approximately in a snug fit by a fastening screw inserted through a radial bore of the cassette and cooperating with a radial threaded bore which extends from the bottom of the pocket to the end-face of the carrier body.

11. A milling cutter according to claim 10, wherein the carrier body has a top end having a first diameter and a bottom end-face having a second diameter, wherein the second diameter is smaller than the first diameter.

12. A milling cutter according to claim 11, wherein the outer contour of the carrier body in radial section between the pockets is approximately S-shaped.

* * * * *